United States Patent [19]

Loeffler et al.

[11] Patent Number: 5,484,460
[45] Date of Patent: Jan. 16, 1996

[54] DYE MIXTURES CONTAINING AZO DYES HAVING A COUPLING COMPONENT FROM THE DIAMINOPYRIDINE SERIES

[75] Inventors: Hermann Loeffler, Speyer; Gunther Lamm, Hassloch; Volker Bach, Neustadt; Arno Lange, Bad Duerkheim; Helmut Reichelt, Neustadt; Herbert Rothmaier, Altdorf, all of Germany

[73] Assignee: BASF Aktiengesellschaft, Ludwigshafen, Germany

[21] Appl. No.: 338,208

[22] Filed: Nov. 9, 1994

Related U.S. Application Data

[62] Division of Ser. No. 159,301, Nov. 30, 1993, Pat. No. 5,403,363.

[30] Foreign Application Priority Data

Dec. 7, 1992 [DE] Germany .......................... 42 41 116.5
Mar. 2, 1993 [DE] Germany .......................... 43 06 391.8

[51] Int. Cl.⁶ .......................... C09B 67/22; C09B 67/38; D06P 1/16; D06P 3/54
[52] U.S. Cl. .......................... 8/638; 8/639; 8/643; 8/662; 8/922
[58] Field of Search .......................... 8/638, 639, 643, 8/662, 922

[56] References Cited

U.S. PATENT DOCUMENTS

| | | | |
|---|---|---|---|
| 3,998,802 | 12/1976 | Dehnert et al. | |
| 4,042,578 | 8/1977 | Dehnert et al. | |
| 4,185,959 | 1/1980 | Imada | 8/638 |
| 4,855,413 | 8/1989 | Dehnert et al. | 534/766 |
| 4,908,041 | 3/1990 | Hahn et al. | 8/638 |
| 5,112,362 | 5/1992 | Hahn et al. | 8/639 |
| 5,283,326 | 2/1994 | Hansen et al. | 534/766 |
| 5,330,543 | 7/1994 | Hansen et al. | 8/662 |
| 5,376,150 | 12/1994 | Lange et al. | 8/638 |

FOREIGN PATENT DOCUMENTS

| | | |
|---|---|---|
| 0244740 | 11/1987 | European Pat. Off. |
| 0214445 | 3/1988 | European Pat. Off. |
| 0433693A1 | 6/1991 | European Pat. Off. |
| 0450434A2 | 10/1991 | European Pat. Off. |
| 0548715A1 | 6/1993 | European Pat. Off. |
| 2118075 | 7/1972 | France |
| 2187857 | 1/1974 | France |

*Primary Examiner*—Margaret Einsmann
*Attorney, Agent, or Firm*—Oblon, Spivak, McClelland, Maier & Neustadt

[57] ABSTRACT

Dye mixtures comprising at least six isochromatic dyes of the formula

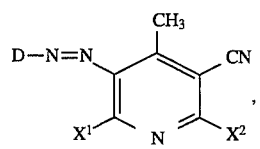

where
D is the radical of a diazo component of the aniline, aminothiophene, aminothiazole, aminoisothiazole or aminobenzisothiazole series and
one of the radicals $X^1$ and $X^2$ is amino and the other is a radical of the formula

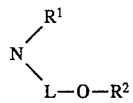

where
L is unsubstituted or substituted $C_2$-$C_8$-alkylene
$R^1$ is hydrogen or unsubstituted or substituted $C_1$-$C_4$-alkyl and
$R^2$ is hydrogen, $C_1$-$C_4$-alkyl, benzyl, phenyl, or $C_1$-$C_8$-alkanoyl,
and the use thereof for dyeing or printing textile materials, and dye mixtures comprising thienylazopyridine dyes and anthraquinone dyes and the use thereof for dyeing or printing textile materials.

11 Claims, No Drawings

DYE MIXTURES CONTAINING AZO DYES HAVING A COUPLING COMPONENT FROM THE DIAMINOPYRIDINE SERIES

This is a division, of application Ser. No. 08/159,301 filed on Nov. 30, 1993 now U.S. Pat. No. 5,403,363.

The present invention relates to novel dye mixtures comprising at least six isochromatic dyes of the formula I

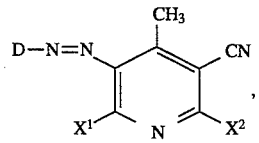

where

D is the radical of a diazo component from the aniline, aminothiophene, aminothiazole, aminoisothiazole or aminobenzisothiazole series and one of the radicals $X^1$ and $X^2$ is amino and the other is a radical of the formula

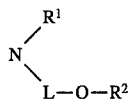

where

L is $C_2$-$C_8$-alkylene which is uninterrupted or interrupted by one or two oxygen atoms in an ether function, $R^1$ is hydrogen or $C_1$-$C_4$-alkyl which is unsubstituted or substituted by hydroxyl, $C_1$-$C_4$-alkoxy or $C_1$-$C_8$-alkanoyloxy, and $R^2$ is hydrogen, $C_1$-$C_4$-alkyl, benzyl, phenyl or $C_1$-$C_8$-alkanoyl and the use thereof for dyeing or printing textile materials, and to dye mixtures comprising thienylazopyridine dyes and anthraquinone dyes and the use thereof for dyeing or printing textile materials.

The individual dyes of the abovementioned dye mixtures or alternatively mixtures which contain up to four individual components are already known from U.S. Pat. No. 4,855,412, U.S. Pat. No. 4,855,413 or EP-A-201,896.

However, it has been shown that the dyes of the prior art still have deficiencies in their application properties. A strong temperature dependence of the absorption behavior of the dyes, the tendency of the dispersed dyes or dye mixtures to recrystallize and an inadequate bath exhaustion can be mentioned here in particular.

It is an object of the present invention to provide novel dye mixtures which are free of the abovementioned deficiencies.

We have found that this object can be achieved by the dye mixtures further described at the beginning.

All alkyl and alkylene groups occurring in the dye components of the dye mixtures according to the invention can be either straight-chain or branched.

If substituted alkyl groups occur in the dye components, as a rule these have 1 or 2 substituents.

If substituted phenyl groups occur in the dye components, as a rule these have 1 to 3, preferably 1 or 2, substituents.

Preferred dye mixtures according to the invention are those where

D is a radical of the formula

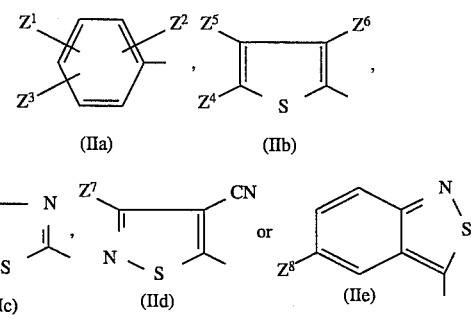

where $Z^1$ is hydrogen, nitro, cyano, $C_1$-$C_9$-alkoxycarbonyl which can be interrupted by one or two oxygen atoms in an ether function, $C_1$-$C_9$-alkylaminocarbonyl which can be interrupted by one or two oxygen atoms in an ether function, trifluoromethyl, $C_1$-$C_4$-alkylsulfonyl, 3-($C_1$-$C_4$-alkyl)-1,2,4-oxadiazol-5-yl or 3-phenyl-1,2,4-oxadiazol-5-yl, $Z^2$ is hydrogen, chlorine, bromine, cyano, methyl, methoxy, ethoxy, phenylazo or benzoyl which is unsubstituted or substituted by methyl, methoxy or chlorine, $Z^3$ is hydrogen, cyano, chlorine, bromine or $C_1$-$C_9$-alkoxycarbonyl which can be interrupted by one or two oxygen atoms in an ether function, or $Z^2$ and $Z^3$ together are a radical of the formula CO-$NA^1$-CO, where $A^1$ has the meaning of hydrogen or $C_1$-$C_4$-alkyl, $Z^4$ is cyano, formyl, nitro, $C_1$-$C_9$-alkoxycarbonyl which can be interrupted by one or two oxygen atoms in an ether function, or is unsubstituted or cyano-substituted phenylazo or a radical of the formula

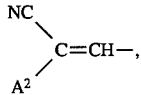

where $A^2$ has the meaning of cyano or $C_1$-$C_9$-alkoxycarbonyl which can be interrupted by one or two oxygen atoms in an ether function, $Z^5$ is hydrogen, $C_1$-$C_4$-alkyl, $C_1$-$C_4$-alkoxy, phenyl which is unsubstituted or substituted by methyl, methoxy or chlorine, benzyl which is unsubstituted or substituted by methyl, methoxy or chlorine, $C_1$-$C_4$-alkylsulfonyl, chlorine, bromine or $C_1$-$C_9$-alkoxycarbonyl which can be interrupted by one or two oxygen atoms in an ether function, $Z^6$ is $C_1$-$C_4$-alkyl, phenyl which is unsubstituted or substituted by methyl, methoxy or chlorine, benzyl which is unsubstituted or substituted by methyl, methoxy or chlorine, cyano, nitro, $C_1$-$C_9$-alkoxycarbonyl which can be interrupted by one or two oxygen atoms in an ether function, or $C_1$-$C_4$-alkylsulfonyl, $Z^7$ is $C_1$-$C_4$-alkyl, phenyl which is unsubstituted or substituted by methyl, methoxy or chlorine, benzyl which is unsubstituted or substituted by methyl, methoxy or chlorine, or $C_1$-$C_4$-alkylsulfonyl, and $Z^8$ is nitro, cyano or $C_1$-$C_4$-alkylsulfonyl.

If D is a radical of the formula IIa, those dyes are preferred in which at least one of the radicals $Z^1$, $Z^2$ and $Z^3$ is other than hydrogen.

$R^1$, $R^2$, $Z^5$, $Z^6$, $Z^7$ and $A^1$ radicals are eg. methyl, ethyl, propyl, isopropyl, butyl, isobutyl or sec-butyl.

$Z^5$, $Z^6$ and $Z^8$ radicals are, like $Z^1$ radicals, furthermore eg. methylsulfonyl, ethylsulfonyl, propylsulfonyl, isopropylsulfonyl, butylsulfonyl, isobutylsulfonyl or sec-butylsulfonyl.

$Z^1$, $Z^5$ and $Z^6$ radicals are, like $Z^3$, $Z^4$ and $A^2$ radicals, furthermore eg. methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl, tert-pentyloxycarbonyl, hexyloxycarbonyl, 2-methylpentyloxycarbonyl, heptyloxycarbonyl, 2-methylhexyloxycarbonyl, octyloxycarbonyl, isooctyloxycarbonyl, 2-ethylhexyloxycarbonyl, nonyloxycarbonyl or isononyloxycarbonyl.

$Z^1$ radicals are furthermore eg. methylaminocarbonyl, ethylaminocarbonyl, propylaminocarbonyl, isopropylaminocarbonyl, butylaminocarbonyl, isobutylaminocarbonyl, sec-butylaminocarbonyl, pentylaminocarbonyl, isopentylaminocarbonyl, neopentylaminocarbonyl, tert-pentylaminocarbonyl, hexylaminocarbonyl, 2-methylpentylaminocarbonyl, heptylaminocarbonyl, 2-methylhexylaminocarbonyl, octylaminocarbonyl, isooctylaminocarbonyl, 2-ethylhexylaminocarbonyl, nonylaminocarbonyl or isononylaminocarbonyl.

$R^2$ radicals are furthermore eg. formyl, acetyl, propionyl, butyryl, isobutyryl, pentanoyl, isopentanoyl, hexanoyl, heptanoyl, octanoyl or 2-ethylhexanoyl.

$R^1$ radicals are furthermore eg. 2-hydroxyethyl, 2- or 3-hydroxypropyl, 2- or 4-hydroxybutyl, 2-methoxyethyl, 2-ethoxyethyl, 2-propoxyethyl, 2-isopropoxyethyl, -butoxyethyl, 2- or 3-methoxypropyl, 2- or 3-ethoxypropyl, 2- or 3-propoxypropyl, 2- or 3-isopropoxypropyl, 2- or 3-butoxypropyl, 2- or 4-methoxybutyl, 2- or 4-ethoxybutyl, 2- or 4-propoxybutyl, 2- or 4-isopropoxybutyl, 2- or 4-butoxybutyl, 2-formyloxyethyl, 2-acetyloxyethyl, 2-propionyloxyethyl, 2-butyryloxyethyl, 2-isobutyryloxyethyl, 2-pentanoyloxyethyl, 2-isopentanoyloxyethyl, 2-hexanoyloxyethyl, 2-heptanoyloxyethyl, 2-octanoyloxyethyl, 2- (2-ethylhexanoyloxy)ethyl, 2- or 3-formyloxypropyl, 2- or 3-acetyloxypropyl, 2- or 3-propionyloxypropyl, 2- or 3-butyryloxypropyl, 2- or 3-isobutyryloxypropyl, 2- or 3-pentanoyloxypropyl, 2- or 3-isopentanoyloxypropyl, 2- or 3-hexanoyloxypropyl, 2- or 3-heptanoyloxypropyl, 2- or 3-octanoyloxypropyl, 2- or 3-(ethylhexanoyloxy)propyl, 2- or 4-formyloxybutyl, 2- or 4-acetyloxybutyl, 2- or 4-propionyloxybutyl, 2- or 4-butyryloxybutyl, 2- or 4-isobutyryloxybutyl, 2- or 4-pentanoyloxybutyl, 2- or 4-hexanoyloxybutyl, 2- or 4-heptanoyloxybutyl, 2- or 4-octanoyloxybutyl or 2- or 4-(2-ethylhexanoyloxy)butyl.

$Z^5$ radicals are furthermore eg. methoxy, ethoxy, propoxy, isopropoxy, butoxy, isobutoxy or sec-butoxy.

$Z^5$, $Z^6$ and $Z^7$ radicals are furthermore eg. phenyl, 2-, 3- or 4-methylphenyl, 2,4-dimethylphenyl, 2-, 3- or 4-methoxyphenyl, 2,4-dimethoxyphenyl, 2-, 3- or 4-chlorophenyl, 2,4-dichlorophenyl, 2-methyl-4-chlorophenyl, 2-methyl-4-methoxyphenyl, benzyl, 2-, 3- or 4-methylbenzyl, 2-, 3- or 4-methoxybenzyl or 2-, 3- or 4-chlorobenzyl.

L radicals are eg. $CH_2$, $(CH_2)_2$, $(CH_2)_3$, $(CH_2)_4$, $(CH_2)_5$, $(CH_2)_6$, $(CH_2)_7$, $(CH_2)_8$, $CH(CH_3)CH_2$, $CH(CH_3)CH(CH_3)$, $(CH_2)_2O(CH_2)_2$, $(CH_2)_2O(CH_2)_3$, $(CH_2)_3O(CH_2)_3$, $(CH_2)_3O(CH_2)_4$, $(CH_2)_4O(CH_2)_4$, $CH(CH_3)CH_2OCH_2CH(CH_3)$ or $(CH_2)_2O(CH_2)_2O(CH_2)_2$. $Z^2$ radicals are eg. benzoyl, 2-, 3- or 4-methylbenzoyl, 2- or 4-methoxybenzoyl or 2-, 3- or 4-chlorobenzoyl.

Preferred dye mixtures according to the invention are furthermore those containing 6 to 12, in particular 6 to 8 or 10 to 12, isochromatic dyes of the formula I, where dye mixtures according to the invention containing 8 isochromatic dyes of the formula I are particularly to be emphasized.

Particularly preferred dye mixtures according to the invention are those where D is a radical of the formula IIb, IIc or IId, where a radical of the formula IIb is particularly to be emphasized.

Particularly preferred dye mixtures according to the invention are furthermore those where $R^2$ is $C_1$-$C_5$-alkanoyl and L is $C_4$-$C_8$-alkylene which is interrupted by 1 or 2 oxygen atoms in an ether function.

Very particularly preferred dye mixtures according to the invention are those where L is a radical of the formula $(CH_2)_2O(CH_2)_2$, $(CH_2)_2O(CH_2)_3$, $(CH_2)_3O(CH_2)_3$, $(CH_2)_3O(CH_2)_4$ or $(CH_2)_2O(CH_2)_2O(CH_2)_2$.

Very particularly preferred dye mixtures according to the invention are furthermore those where $R^2$ is acetyl.

Very particularly preferred dye mixtures according to the invention are furthermore those where D is a radical of the formula III

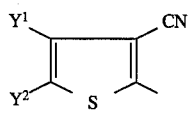
(III)

where $Y^1$ is methyl or chlorine and $Y^2$ is cyano or formyl.

The novel dye mixtures can be obtained eg. by the method described in the following.

For example, 2,6-dichloro-3-cyano-4-methylpyridine can be converted with ammonia in a manner known per se into the corresponding aminochloropyridines of the formulae IVa and IVb

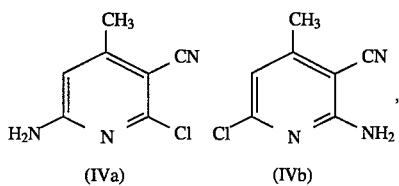

where the isomers IVa and IVb are formed in the molar ratio 3:17 to 2:3.

In a subsequent reaction, the aminochloropyridines IVa/IVb can be reacted with a mixture of at least two amines of the formula V

where L and $R^1$ in each case have the abovementioned meaning and $R^3$ is hydrogen, $C_1$-$C_4$-alkyl, benzyl or phenyl. The amines of the formula V must differ here in at least one of the variables L, $R^1$ and $R^3$ and additionally $R^3$ must be hydrogen in at least one amine of the formula V.

In this reaction, the diaminopyridine mixtures of the formulae VIa and VIb (VIa)

(VIb)

result, where L and $R^1$ in each case have the abovementioned meaning, in the appropriate molar ratio.

Following this, the resulting diaminopyridine mixture can be a) first acylated, which can be carried out eg. by reaction with a carboxylic acid of the formula VII $$R^4\text{—OH} \qquad (VII),$$

where $R^4$ is $C_1$-$C_8$-alkanoyl, in the presence or absence of mineral acid, and b) then coupled with a diazonium salt which is derived from an amine of the formula VIII $$D\text{—NH}_2 \qquad (VIII),$$

where D has the abovementioned meaning.

If $R^1$ in formula VIa/VIb is hydroxy-substituted $C_1$-$C_4$-alkyl, a double acylation is carried out in step a).

However, the coupling of the diaminopyridine mixture with the diazonium salt can be carried out first and the acylation reaction can be carried out subsequently. This last-mentioned procedure is preferred.

In this method, during the precipitation of the dye mixture from the carboxylic acid, the mixture is obtained in high purity and in optimum crystal shape and crystal size. This minimizes the expense of dispersing the dye mixtures which is necessary before use and prevents their crystal growth in the dye liquor.

In many cases, the dye mixtures according to the invention are obtained in a mixture of two different crystal modifications.

The novel dye mixtures are advantageously suited to the dyeing or printing of textile materials. These are eg. fibers or fabric, in particular of polyesters, in addition also of cellulose esters or polyamides, or a blended fabric of polyesters and cellulose fibers or wool.

The dye mixtures according to the invention show virtually no temperature dependence on the absorption behavior of the dyes. They additionally have a high bath exhaustion and their tendency to recrystallize in dispersed form is very low.

The present invention furthermore relates to novel dye mixtures comprising one or more red azo dyes of the formula IX (IX)

where one of $U^1$ and $U^2$ is a radical of the formula and the other is a radical of the formula NH-B, where L is $C_2$-$C_8$-alkylene, which may be interrupted by 1 or 2 oxygen atoms in ether function, $R^1$ is hydrogen or $C_1$-$C_4$-alkyl, which may be substituted by hydroxyl, $C_1$-$C_4$-alkoxy or $C_1$-$C_8$-alkanoyloxy, $R^2$ is hydrogen, $C_1$-$C_4$-alkyl, benzyl, phenyl or $C_1$-$C_8$-alkanoyl and B is hydrogen, $C_1$-$C_4$-alkyl which may be hydroxyl-substituted, or a radical of the formula L-O-$R^2$, where L and $R^2$ are each as defined above, $U^3$ is hydrogen or $C_1$-$C_4$-alkyl, $Q^1$ is cyano, formyl, nitro or $C_1$-$C_9$-alkoxycarbonyl, which may be interrupted by 1 or 2 oxygen atoms in ether function, $Q^2$ is hydrogen, $C_1$-$C_4$-alkyl, $C_1$-$C_4$-alkoxy, phenyl, which may be methyl-, methoxy- or chlorine-substituted, benzyl, which may be methyl-, methoxy- or chlorine-substituted, $C_1$-$C_4$-alkylsulfonyl, chlorine, bromine or $C_1$-$C_9$-alkoxycarbonyl, which may be interrupted by 1 or 2 oxygen atoms in ether function, and $Q^3$ is cyano, nitro, $C_1$-$C_9$-alkoxycarbonyl, which may be interrupted by 1 or 2 oxygen atoms in ether function, or $C_1$-$C_4$-alkylsulfonyl, one or more yellow dyes of the formula X and/or XI (X)

(XI)

where $E^1$, $E^2$, $E^3$, $E^4$ and $E^5$ are independently of each other hydrogen, $C_1$-$C_4$-alkyl, $C_1$-$C_4$-alkoxy, halogen or phenoxy, and/or one or more blue anthraquinone dyes of the formula XII where one of the two radicals $G^1$ and $G^2$ is hydroxyl and the other is phenylamino, which may be substituted by hydroxyl, $C_1$-$C_4$-alkyl or $C_1$-$C_4$-alkoxy, dye preparations comprising these dye mixtures, and the use thereof for dyeing or printing textile materials.

Textile dyes used in the automotive sector, for example for seat covers, have to meet high application requirements, since they have to cope at one and the same time with strong light and high temperatures. The most important parameter accordingly is good hot lightfastness. This applies especially to dye mixtures, in particular those for trichromatic dyeing.

It is a further object of the present invention to provide novel dye mixtures having advantageous properties for use in the automotive sector. The novel mixtures shall possess in particular good hot light-fastness and high color strength.

We have found that this object is achieved by the second-mentioned dye mixtures defined above.

B, $U^3$, $E^1$, $E^2$, $E^3$, $E^4$, $E^5$ and $Q^2$ are each for example methyl, ethyl, propyl, isopropyl, butyl, isobutyl or sec-butyl.

$Q^3$ is, and $Q^2$ may also be, for example methylsulfonyl, ethylsulfonyl, propylsulfonyl, isopropylsulfonyl, butylsulfonyl, isobutylsulfonyl or sec-butylsulfonyl.

$Q^2$ may also be for example phenyl, 2-, 3- or 4-methylphenyl, 2,4-dimethylphenyl, 2-, 3- or 4-methoxyphenyl, 2,4-dimethoxyphenyl, 2-, 3- or 4-chlorophenyl, 2,4-dichlorophenyl, 2-methyl-4-chlorophenyl, 2-methyl-4-methoxyphenyl, benzyl, 2-, 3- or 4-methylbenzyl, 2-, 3- or 4-methoxybenzyl or 2-, 3- or 4-chlorobenzyl.

$Q^1$ is, and $Q^2$ and $Q^3$ may each also be, for example methoxycarbonyl, ethoxycarbonyl, propoxycarbonyl, isopropoxycarbonyl, butoxycarbonyl, isobutoxycarbonyl, secbutoxycarbonyl, pentyloxycarbonyl, isopentyloxycarbonyl, neopentyloxycarbonyl, tert-pentyloxycarbonyl, hexyloxycarbonyl, 2-methylpentyloxycarbonyl, heptyloxycarbonyl, 2-methylhexyloxycarbonyl, octyloxycarbonyl, isooctyloxycarbonyl, 2-ethylhexyloxycarbonyl, nonyloxycarbonyl or isononyloxycarbonyl.

$E^1$, $E^2$, $E^3$, $E^4$, $E^5$ and $Q^2$ may each also be for example methoxy, ethoxy, propoxy, isopropoxy, butoxy, isobutoxy or sec-butoxy.

$E^1$, $E^2$, $E^3$, $E^4$ and $E^5$ may each also be for example fluorine, chlorine or bromine.

$G^1$ or $G^2$ is for example phenylamino, 4-hydroxyphenylamino, 4-methylphenylamino or 4-methoxyphenylamino.

Reference should be made to previous remarks for the definitions of $R^1$, $R^2$ and L.

Preference is given to dye mixtures comprising an azo dye of the formula IX where one of $U^1$ and $U^2$ is amino and the other is a radical of the formula

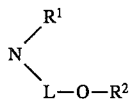

where L, $R^1$ and $R^2$ are each as defined above.

Preference is further given to dye mixtures comprising an azo dye of the formula IX where $Q^1$ is cyano or formyl, $Q^2$ is $C_1$-$C_4$-alkyl or chlorine, and $Q^3$ is cyano.

Preference is further given to dye mixtures comprising an azo dye of the formula IX where $U^3$ is methyl.

Preference is further given to dye mixtures comprising an azo dye of the formula IX where $R^2$ is $C_1$-$C_5$-alkanoyl and L is $C_4$-$C_8$-alkylene which is interrupted by 1 or 2 oxygen atoms in ether function.

Particular preference is given to dye mixtures comprising an azo dye of the formula IX where L is a radical of the formula $(CH_2)_2O(CH_2)_2$, $(CH_2)_2O(CH_2)_3$, $(CH_2)_3O(CH_2)_3$, $(CH_2)_3O(CH_2)_4$ or $(CH_2)_2O(CH_2)_2O(CH_2)_2$.

Particular preference is further given to dye mixtures comprising an azo dye of the formula IX where $R^2$ is acetyl.

Particular preference is further given to dye mixtures comprising an azo dye of the formula IX where $Q^1$ and $Q^3$ are each cyano and $Q^2$ is $C_1$-$C_4$-alkyl, in particular methyl.

Attention is further drawn to dye mixtures comprising at least 6 azo dyes of the formula IX.

Attention is drawn especially to dye mixtures comprising from 6 to 12, particularly from 6 to 8 or from 10 to 12, azo dyes of the formula IX, in particular to dye mixtures comprising 8 azo dyes of the formula IX.

When the dye mixtures of the invention contain a dye of the formula XI, preference is given to those mixtures which include a dye of the formula XIa

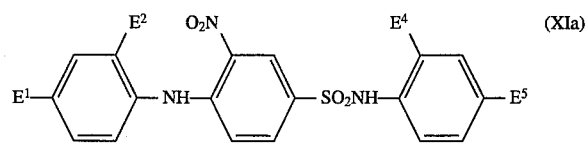

where $E^1$, $E^2$, $E^4$ and $E^5$ are each either hydrogen or methyl

The weight ratio between the dyes IX, X, XI and/or XII can vary within wide limits and depends in particular on the hue to be matched. Examples of weight ratios between the dyes of the mixtures according to the invention are as follows:

Mixtures of the dyes IX and X: from 2.0:98.0 to 99.8:0.2.

Mixtures of the dyes IX and XI: from 1.3:98.7 to 99.8:0.2.

Mixtures of the dyes IX and XII: from 1.8:98.2 to 98.1:1.9.

Mixtures of the dyes IX, XII and X: from 97.8:2.0:0.2 to 0.9:51.7:47.4, from 80.6:1.6:17.8 to 1.8:97.4:0.8, from 80.5:19.4:0.1 to 1.9:8.1:90.0.

Mixtures of the dyes IX, XII and XI: from 97.8:2.0:0.2 to 0.7:41.7:57.6, from 74.0:1.4:24.6 to 1.8:97.1:1.1, from 97.9:1.9:0.2 to 1.3:5.6:93.1.

The dyes of the formulae IX, X, XI and XII are known per se.

Dyes of the formula IX are known for example from U.S. Pat. No. 4,855,412, U.S. Pat. No. 4,855,413 or EP-A-201 896.

The dye of the formula X is known as C.I. Solvent Yellow 163 (58 840).

Dyes of the formula XI are described for example in JP-A-281 666/1991. The unsubstituted dye ($E^1$ to $E^5$=H) is known under the name Disperse Yellow 42 (C.I. 10 338).

The dye of the formula XII ($G^1$=phenylamino, $G^2$=hydroxyl) is known as C.I. Disperse Blue 77 (60 766).

The dye mixtures of the invention may further comprise up to 30% by weight, preferably up to 20% by weight, each percentage being based on the total weight of the dyes IX, X, XI and/or XII, of one or more shading dyes.

Suitable yellow to orange shading dyes are for example the following dyes which are known per se and are usually commercially available:

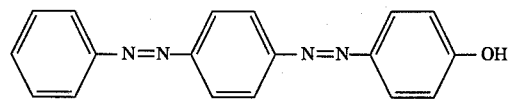

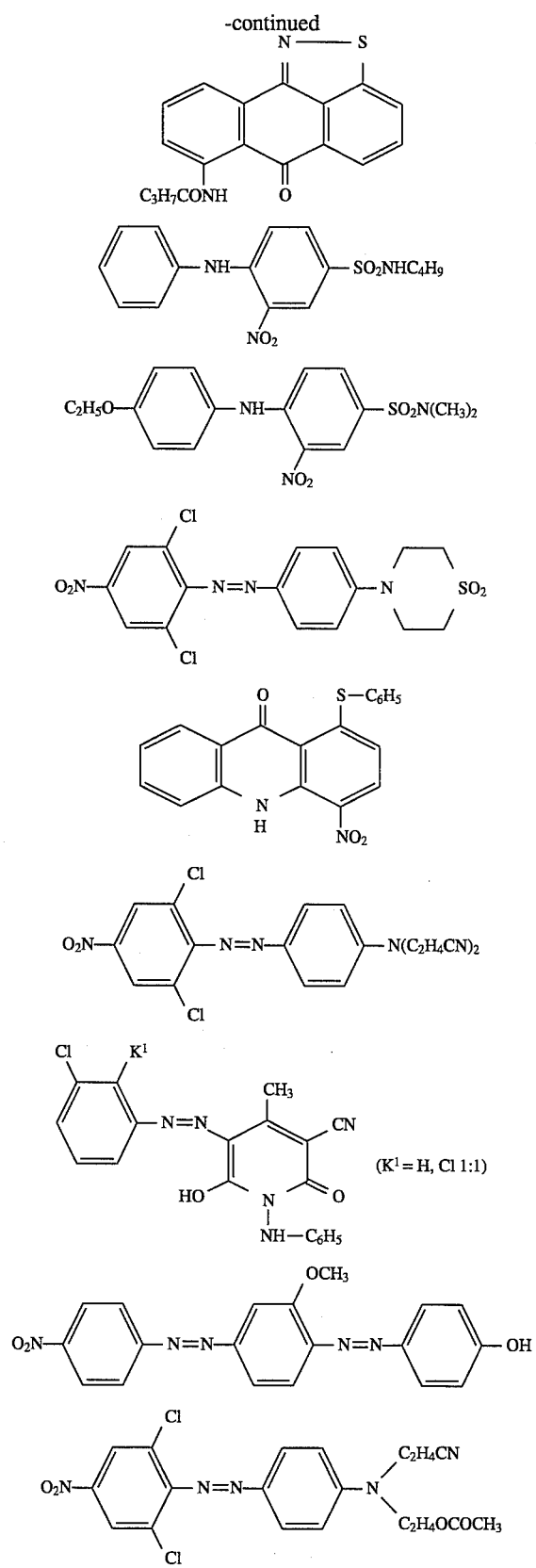
Suitable red shading dyes are for example the following dyes which are known per se and are usually commercially available:

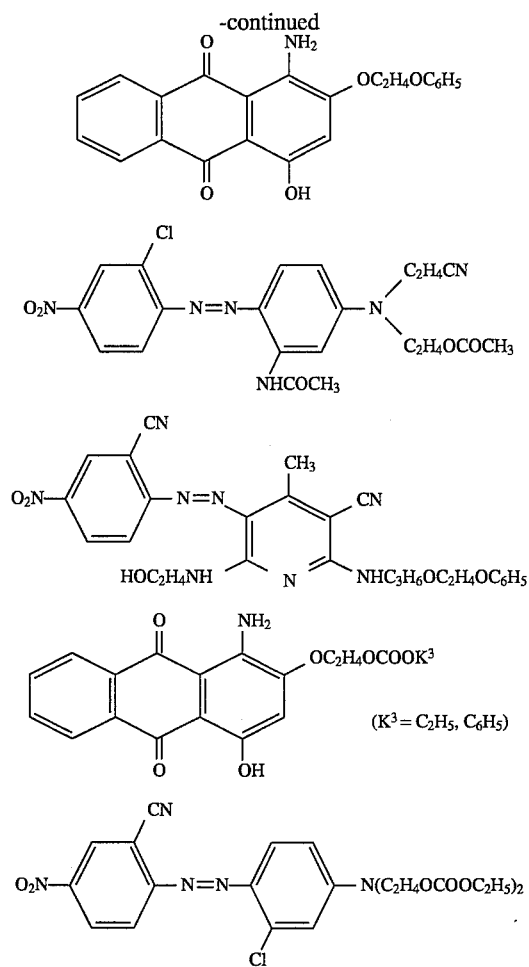
Suitable blue to violet shading dyes are for example the following dyes which are known per se and are usually commercially available:
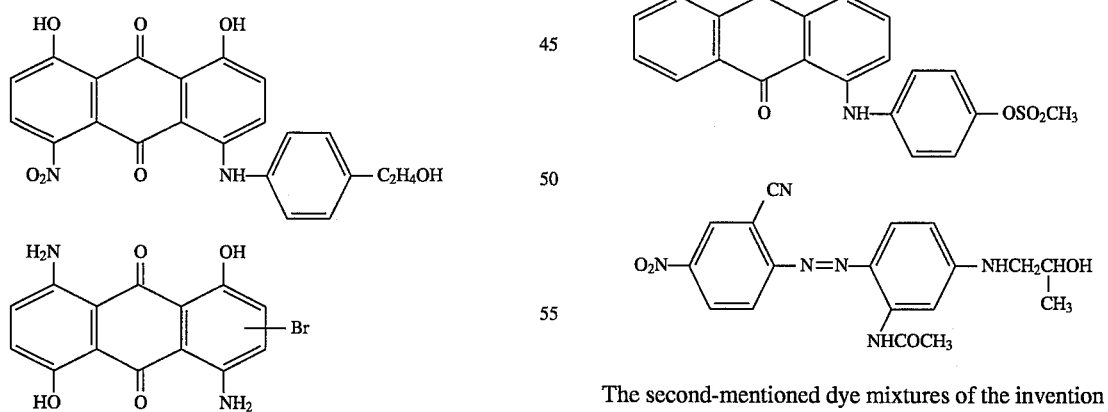
The second-mentioned dye mixtures of the invention may include UV absorbers. Suitable UV absorbers are for example those of the formula XIII or XIV:

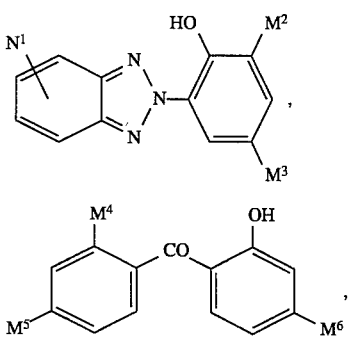

where $M^1$ is hydrogen or chlorine, $M^2$ and $M^3$ are identical or different and each is independently of the other hydrogen or $C_1$-$C_8$-alkyl, which may be substituted by phenyl, $M^4$ is hydrogen or hydroxyl, and $M^5$ and $M^6$ are identical or different and each is independently of the other hydrogen, hydroxyl, or $C_1$-$C_6$-alkoxy, which may be substituted by hydroxyl, $C_1$-$C_4$-alkoxy, $C_1$-$C_4$-alkanoyloxy or benzoyloxy.

Of particular suitability are UV absorbers of the formula XIIIa, XIIIb, XIVa, XIVb or XIVc

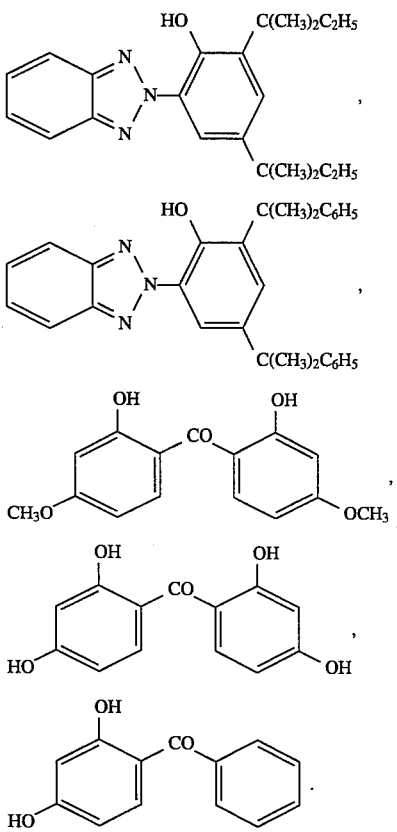

The UV absorbers can be used individually or else mixed with one another, in which case mixtures of different species of the formula XIII or XIV or else mixtures of compounds of the formulae XIII and XIV are suitable.

In general, the amount of UV absorber used is from 0 to 6% by weight, preferably from 2 to 4% by weight, each percentage being based on the weight of the textile material to be dyed.

The second-mentioned dye mixtures of the invention are prepared in a conventional manner, for example by mixing the respective components in the stated weight ratio. If desired, the novel mixtures may include further components, for example dispersants, such as ligninsulfonates or sulfonation products of the reaction product of formaldehyde with aromatics, or other assistants. It is also possible to mix ready-prepared dye preparations of the respective dye components or ready-prepared dye preparations with pure dyes.

Dye preparations based on the second-mentioned novel dye mixtures contain in general from 10 to 60% by weight, based on the weight of the dye preparation, of an above-defined dye mixture and also from 40 to 90% by weight, based on the weight of the dye preparation, of dispersants, further assistants and/or water.

The second-mentioned novel dye mixtures are useful for dyeing or printing textile materials. For the purposes of the present invention textile materials are such as fibers, knitted fabrics or woven fabrics made of polyester, modified polyester, e.g. anionically modified polyester, or blends of polyesters with cellulose, cotton, viscose or wool. The dyeing and printing methods are known per se. Details can also be found in the Examples. Attention is drawn in particular to the use of these dye mixtures for dyeing or printing textile materials used in the automotive sector.

The second-mentioned dye mixtures of the invention, which have high color strength, are notable for high hot lightfastness (FAKRA, DIN 75 202), even under conditions of high energy of irradiation (testing in accordance with SAE J1 885, 601 kJ). They produce dyeings of high reproducibility (pH and reduction stability). They have high color strength, high fastness values (eg. rub fastness, perspiration fastness, water droplet fastness, water fastness or solvent fastness) and a high contact heat stability.

The following examples illustrate the invention. The percentage data in Examples 1 to 7 in respect of the composition of the dye mixtures are the surface area percentages resulting from the respective HPLC investigations.

EXAMPLE 1 a) 16.3 g of 2-amino-3,5-dicyano-4-methylthiophene were dissolved with cooling in 250 g of 65% strength by weight sulfuric acid. 31.5 g of nitrosylsulfuric acid (40% strength by weight) were added dropwise to this solution with further cooling at from 0° to +5° C. and the mixture was-stirred for 1.5 h at this temperature.

b) A mixture of 17 g of water-moist 2-chloro-3-cyano-4-methyl-6-aminopyridine and the corresponding 6-chloro-2-amino isomer (calculated dry and obtained by the process described in DE-A-2,260,827), 20 ml of isobutanol, 11.8 g of 1-amino-8-hydroxy-4-oxaoctane, 4.7 g of 1-amino-5-hydroxy-3-oxapentane and 8 g of sodium carbonate was stirred at from 145° to 150° C. for 5 h under a descending condenser. After cooling to 100° C., 35 ml of acetic acid and, at 35° to 40° C. with slight cooling, 15 g of 96% strength by weight sulfuric acid were added dropwise. After stirring for 3 hours, about 92% of the four hydroxy compounds was acetylated.

c) The solution of the diazonium salt described in a) was allowed to run into the well-stirred mixture of the coupling components thus obtained, 300 g of ice and 100 ml of water, and the mixture was stirred at from 0° to 5° C. for about 2 h. The product was filtered off with suction, washed until neutral and dried at 100° C. under reduced pressure.

The resulting brown powder consists of the 8 dye species:

[Structure: thiophene ring with H3C, NC, CN substituents connected via N=N to a pyridine ring with CH3, CN, HN-W¹, N, NH-W² groups]

| | | | |
|---|---|---|---|---|
| 1. | W¹ = | H | | 5.2% |
| | W² = | $(CH_2)_3-O-(CH_2)_4-OH$ | | |
| 2. | W¹ = | $(CH_2)_3-O-(CH_2)_4-OH$ | | 2.5% |
| | W² = | H | | |
| 3. | W¹ = | H | | 39.6% |
| | W² = | $(CH_2)_3-O-(CH_2)_4-OCOCH_3$ | | |
| 4. | W¹ = | $(CH_2)_3-O-(CH_2)_4-OCOCH_3$ | | 18.8% |
| | W² = | H | | |
| 5. | W¹ = | H | | 6.2% |
| | W² = | $(CH_2)_2-O-(CH_2)_2-OH$ | | |
| 6. | W¹ = | $(CH_2)_2-O-(CH_2)_2-OH$ | | 2.4% |
| | W² = | H | | |
| 7. | W¹ = | H | | 15.1% |
| | W² = | $(CH_2)_2-O-(CH_2)_2-OCOCH_3$ | | |
| 8. | W¹ = | $(CH_2)_2-O-(CH_2)_2-OCOCH_3$ | | 6.7% |
| | W² = | H | | |

A dispersion of this dye mixture dyes polyester yarn package (PES) at 130° C. without filter effect to a 2/1 standard depth in a brilliant red shade.

EXAMPLE 2 a) The reaction mixture obtained in Example 1 b) was mixed with 20 ml of water before treatment with acetic acid and brought to a pH of 5 with hydrochloric acid. The organic phase was separated off, dissolved in water at a pH of 3 using further hydrochloric acid and coupled with the diazonium salt described in Example 1 a). By buffering with sodium hydroxide solution to a pH of 4, filtering off with suction, washing with hot water and drying at 100° C., a powdered dye mixture was obtained. It contained the following components:

[Structure: same as above thiophene–azo–pyridine system]

| | | |
|---|---|---|
| 1. | W¹ = | H |
| | W² = | $(CH_2)_3-O-(CH_2)_4-OH$ |
| 2. | W¹ = | $(CH_2)_3-O-(CH_2)_4-OH$ |
| | W² = | H |
| 3. | W¹ = | H |
| | W² = | $(CH_2)_2-O-(CH_2)_2-OH$ |
| 4. | W¹ = | $(CH_2)_2-O-(CH_2)_2-OH$ |
| | W² = | H | b) For partial acetylation, 47.5 g of this dye mixture were stirred under reflux for 4 h in 110 ml of glacial acetic acid. Crystallization was effected by adding 110 ml of water under reflux and subsequently stirring for 1 hour. By squeezing off at room temperature and washing with hot water, a crystalline press material was obtained, the dispersion of which when dyeing polyester yarn packages shows no crystal growth and accordingly a filter effect no longer occurs. The brown suction filter material has a melting point of 188° to 190° C.

The individual species of Example 1 are present here in the following ratios:

| | |
|---|---|
| 1. | 4.4% |
| 2. | 2.0% |
| 3. | 41.7% |
| 4. | 17.6% |
| 5. | 5.6% |
| 6. | 2.1% |
| 7. | 16.2% |
| 8. | 6.1% |

EXAMPLE 3

(Comparison)

The use of 1-amino-5-hydroxy-3-oxapentane is dispensed with in Example 1b and 17 g of 1-amino-8-hydroxy-4-oxaoctane are used instead. A procedure analogue to that of Example 2 is then followed and a dye mixture is obtained, as is described in similar form in Example 1 of U.S. Pat. No. 4,855,413. The individual species are represented therein in the following ratios:

| | |
|---|---|
| 1. | 32.4% |
| 2. | 7.8% |
| 3. | 45.2% |
| 4. | 11.6% |

When dyeing PES yarn packages from dispersion, the greenish dye powder (M.p.: 185° to 190° C.) shows a filter effect on the dyed material.

Changes in the acylation conditions with respect to time, temperature or the water content of the acylation mixture only change the degree of acetylation insubstantially and do not lead to acceptable yarn dyeings.

Perfect yarn dyeings are furthermore guaranteed if in Examples 1 and 2 instead of 2-amino-5-hydroxyoxapentane the amines shown in the following Table 1 are used in the mole fractions given.

The dye mixtures then in each case consist of six individual dyes:

TABLE 1

| Example no. | Amine radical | Mol % | Crystal color | M.p. |
|---|---|---|---|---|
| 4 | $(CH_2)_3-O-(CH_2)_2-O-\phenyl$ | 20 | brown | 174–180 |
| 5 | $(CH_2)_3-O-(CH_2)_2-OC_2H_5$ | 50 | brown | 190–196 |
| 6 | $(CH_2)_3-O-\underset{\underset{CH_3}{\mid}}{CH}-CH_2-OCH_3$ | 50 | brown | 181–190 |

EXAMPLE 7

If, in Example 1, 1-amino-8-hydroxy-4-oxaoctane is replaced by the equivalent amount of 1-amino-8-hydroxy-4,7-dioxaoctane and the further procedure is as described in Example 2, a mixture of six dyes results of the composition:

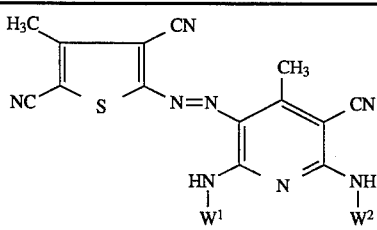

| | | | |
|---|---|---|---|
| 1. | $W^1 =$ | H | 43.7% |
| | $W^2 =$ | $(CH_2)_3-O-(CH_2)_2-OCH_3$ | |
| 2. | $W^1 =$ | $(CH_2)_3-O-(CH_2)_2-OCH_3$ | 22.1% |

-continued

| | | | |
|---|---|---|---|
| | $W^2 =$ | H | |
| 3. | $W^1 =$ | H | 5.8% |
| | $W^2 =$ | $(CH_2)_2-O-(CH_2)_2-OH$ | |
| 4. | $W^1 =$ | $(CH_2)_2-O-(CH_2)_2-OH$ | 2.8% |
| | $W^2 =$ | H | |
| 5. | $W^1 =$ | H | 16.2% |
| | $W^2 =$ | $(CH_2)_2-O-(CH_2)_2-OCOCH_3$ | |
| 6. | $W^1 =$ | $(CH_2)_2-O-(CH_2)_2-OCOCH_3$ | 6.7% |
| | $W^2 =$ | H | |

(M.p.: 177° C.), the PES yarn dyeings of which turn out to be faultless up to 2/1 standard depth of shade.

If, in Example 2, the diazonium salt is replaced by that of the amines shown in the following Table 2, the dyes are obtained as mixtures having 8 components, the composition of which in each case only differs insubstantially from that of Example 2. They also have good dyeing properties.

TABLE 2

| Example No. | Amine | Color shade on PES |
|---|---|---|
| 8 | 3-methyl-4-cyano-5-methoxycarbonyl-2-aminothiophene ($H_3C$, $CN$, $CH_3OOC$, $S$, $NH_2$) | red |
| 9 | 3-methyl-4-methoxycarbonyl-5-cyano-2-aminothiophene ($H_3C$, $COOCH_3$, $NC$, $S$, $NH_2$) | red |
| 10 | 3-chloro-4-cyano-5-formyl-2-aminothiophene ($Cl$, $CN$, $OHC$, $S$, $NH_2$) | violet |
| 11 | 3-methoxycarbonyl-4-cyano-5-methoxycarbonyl-2-aminothiophene ($H_3COOC$, $CN$, $H_3COOC$, $S$, $NH_2$) | red |
| 12 | 2-cyano-4-nitroaniline ($O_2N$—phenyl—$CN$) | scarlet |

TABLE 2-continued

| Example No. | Amine | Color shade on PES |
|---|---|---|
| 13 | 3-methyl-4-ethoxycarbonyl-5-cyano-2-amino thiophene (CH$_3$, CN, H$_5$C$_2$OOC, S, NH$_2$) | red |
| 14 | 3-methyl-4-cyano-5-ethoxycarbonyl-2-amino thiophene (CH$_3$, COOC$_2$H$_5$, NC, S, NH$_2$) | red |
| 15 | 3-chloro-4-(2,2-dicyanovinyl)-5-cyano-2-amino thiophene (Cl, CN, (NC)$_2$C=HC, S, NH$_2$) | blue-violet |
| 16 | 3-ethoxy-4-(2,2-dicyanovinyl)-5-cyano-2-amino thiophene (H$_5$C$_2$O, CN, (NC)$_2$C=HC, S, NH$_2$) | medium blue |
| 17 | (C$_6$H$_5$, CN, NC—C(COOC$_2$H$_5$)=HC, S, NH$_2$) | blue-violet |
| 18 | (C$_6$H$_5$, CN, OHC, S, NH$_2$) | bluish red |
| 19 | (C$_6$H$_5$, COOC$_2$H$_5$, OHC, S, NH$_2$) | red |
| 20 | (H$_5$C$_2$O, CN, OHC, S, NH$_2$) | violet |
| 21 | 2-cyanophenyl-azo-(5-amino-4-cyano-thiophene) | blue |
| 22 | phenyl-azo-(4-aminophenyl) | orange |
| 23 | phenyl-azo-(3-bromo-4-aminophenyl) | yellowish red |
| 24 | phenyl-azo-(2-cyano-4-aminophenyl) | red |

TABLE 2-continued

| Example No. | Amine | Color shade on PES |
|---|---|---|
| 25 | 4-CH₃-C₆H₄-CO-C₆H₃(CN)(NH₂) (2-amino-3-cyano-4'-methylbenzophenone) | yellowish violet |
| 26 | 5-chloro-2-amino-phenyl 3-methyl-1,2,4-oxadiazole | yellow |
| 27 | 5-chloro-2-amino-phenyl 3-phenyl-1,2,4-oxadiazole | yellow |
| 28 | 3-amino-4-chloro-N-butylphthalimide | yellow |
| 29 | 3-amino-5-cyano-2,1-benzisothiazole | red |
| 30 | 4-amino-3,6-dicyano-phenylazobenzene | bluish red |
| 31 | 3-amino-5-nitro-2,1-benzisothiazole | violet |

Dyeing Method 5 g of polyester fabric (PES) are introduced at 50° C. into 100 ml of a dyeing liquor which contains a below-specified dye mixture and whose pH has been adjusted to 4.5 with acetic acid/sodium acetate. After 5 minutes at 50° C. the liquor is raised to 130° C., held at that level for 45 minutes and then cooled down to 70° C. over 20 minutes.

Thereafter the dyed polyester fabric is reduction cleared by treating it at 70° C. for 15 minutes in 200 ml of liquor containing per liter 5 ml of 32% strength by weight sodium hydroxide solution, 3 g of sodium dithionite and 1 g of an addition product of 48 mol of ethylene oxide with 1 mol of castor oil. The fabric is finally rinsed, neutralized with dilute acetic acid, rinsed once more and dried.

The following dye mixtures were used:

| Dye mixture 32 | |
|---|---|
| Formula | Amount based on PES [% by weight] |
| ![structure: phenyl-NH-(phenyl with NO2)-SO2NH-phenyl] | 0.15 | b) Mixture of the following dyes:

| | | 0.02 |
|---|---|---|

[structure: thiophene ring with H3C, CN, NC, S substituents; N=N azo link to pyridine ring with CH3, CN, HN-W¹, NH-W², N]

| | W¹ = | W² = |
|---|---|---|
| 1. | H | $(CH_2)_3-O-(CH_2)_4-OH$ |
| 2. | $(CH_2)_3-O-(CH_2)_4-OH$ | H |
| 3. | H | $(CH_2)_3-O-(CH_2)_4-OCOCH_3$ |
| 4. | $(CH_2)_3-O-(CH_2)_4-OCOCH_3$ | H |
| 5. | H | $(CH_2)_2-O-(CH_2)_2-OH$ |
| 6. | $(CH_2)_2-O-(CH_2)_2-OH$ | H |
| 7. | H | $(CH_2)_2-O-(CH_2)_2-OCOCH_3$ |
| 8. | $(CH_2)_2-O-(CH_2)_2-OCOCH_3$ | H |

| c) | [anthraquinone structure: O2N, OH, HO, NHC6H5 substituents] | 0.06 |
|---|---|---|
| d) | [structure: HO-phenyl(OH)-CO-phenyl] | 1.2 |

| Dye mixture 33 | |
|---|---|
| Formula | Amount based on PES [% by weight] |
| a) [anthraquinone with C6H5S and SC6H5 at 1,8 positions] | 0.06 | b) Mixture of the following dyes:

-continued

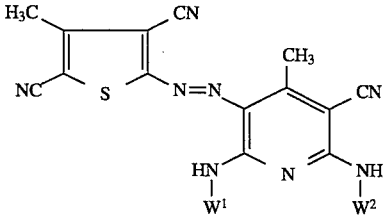

0.02

| 1. | $W^1 =$ | H |
| --- | --- | --- |
|  | $W^2 =$ | $(CH_2)_3-O-(CH_2)_4-OH$ |
| 2. | $W^1 =$ | $(CH_2)_3-O-(CH_2)_4-OH$ |
| 3. | $W^1 =$ | H |
|  | $W^2 =$ | $(CH_2)_3-O-(CH_2)_4-OCOCH_3$ |
| 4. | $W^1 =$ | $(CH_2)_3-O-(CH_2)_4-OCOCH_3$ |
|  | $W^2 =$ | H |
| 5. | $W^1 =$ | H |
|  | $W^2 =$ | $(CH_2)_2-O-(CH_2)_2-OH$ |
| 6. | $W^1 =$ | $(CH_2)_2-O-(CH_2)_2-OH$ |
|  | $W^2 =$ | H |
| 7. | $W^1 =$ | H |
|  | $W^2 =$ | $(CH_2)_2-O-(CH_2)_2-OCOCH_3$ |
| 8. | $W^1 =$ | $(CH_2)_2-O-(CH_2)_2-OCOCH_3$ |
|  | $W^2 =$ | H | c) 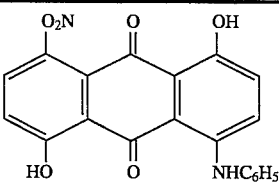 0.08 d) 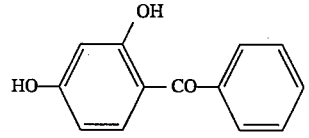 1.2

The following values were found:

Dye mixture 32 $\Delta E_{ab}^* <1.5$

Dye mixture 33 $\Delta E_{ab}^* <1.0$ (The $\Delta E_{ab}^*$ value was determined under the L*a*b* color system (CIE 1976).)

We claim:

1. A dye mixture comprising at least one red azo dye of the formula IX

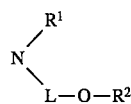 (IX)

where one of $U^1$ and $U^2$ is a radical of the formula $$N{\overset{R^1}{\underset{L-O-R^2}{\diagdown}}}$$

and the other is a radical of the formula NH-B, where

L is $C_2$-$C_8$-alkylene, which may be interrupted by 1 or 2 oxygen atoms in ether function, $R^1$ is hydrogen or $C_1$-$C_4$-alkyl, which may be substituted by hydroxyl, $C_1$-$C_4$-alkoxy or $C_1$-$C_8$-alkanoyloxy, $R^2$ is hydrogen, $C_1$-$C_4$-alkyl, benzyl, phenyl or $C_1$-$C_8$-alkanoyl and B is hydrogen, $C_1$-$C_4$-alkyl which may be hydroxyl-substituted, or a radical of the formula L-O-$R^2$, where L and $R^2$ are each as defined above, $U^3$ is hydrogen or $C_1$-$C_4$-alkyl, $Q^1$ is cyano, formyl, nitro or $C_1$-$C_9$-alkoxycarbonyl, which may be interrupted by 1 or 2 oxygen atoms in ether function, $Q^2$ is hydrogen, $C_1$-$C_4$-alkyl, $C_1$-$C_4$-alkoxy, phenyl, which may be methyl-, methoxy- or chlorine-substituted, benzyl, which may be methyl-, methoxy- or chlorine-substituted, $C_1$-$C_4$-alkylsulfonyl, chlorine, bromine or $C_1$-$C_4$-alkoxycarbonyl, which may be interrupted by 1 or 2 oxygen atoms in ether function, and $Q^3$ is cyano, nitro, $C_1$-$C_9$-alkoxycarbonyl, which may be interrupted by 1 or 2 oxygen atoms in ether function, or $C_1$-$C_4$-alkylsulfonyl, mixed with at least one dye selected from the group consisting of dyes of the formulae X, XI and XII where dyes of the formulae X and XI are yellow dyes

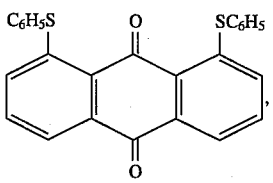

(X)

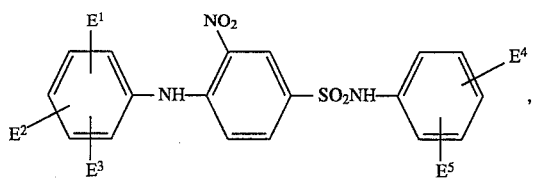

(XI)

where $E^1$, $E^2$, $E^3$, $E^4$ and $E^5$ are independently of each other hydrogen, $C_1$-$C_4$-alkyl, $C_1$-$C_4$-alkoxy, halogen or phenoxy, and dyes of the formula XII are blue anthraquinone dyes

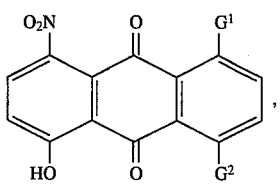

(XII)

where one of the two radicals $G^1$ and $G^2$ is hydroxyl and the other is phenylamino, which may be substituted by hydroxy, $C_1$-$C_4$-alkyl or $C_1$-$C_4$-alkoxy, the dye of formula IX and each dye of formula X, XI or XII present in the dye mixture being present in amount adequate to match a selected hue different from that matched by any individual dye.

2. A dye mixture as claimed in claim 1, wherein one of $U^1$ and $U^2$ is $NH_2$ and the other is a radical of the formula

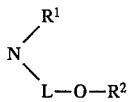

where L, $R^1$ and $R^2$ are each as defined in claim 1.

3. A dye mixture as claimed in claim 1, comprising at least 6 azo dyes of the formula IX.

4. A dye mixture as claimed in claim 1, further comprising up to 30% by weight based on the total weight of said dye mixture of one or more shading dyes.

5. A method of dying or printing a textile material which comprises applying to said textile material a dye mixture as claimed in claim 1.

6. The dye mixture of claim 1 containing dyes of formulae IX and X, wherein the dye of formula IX is present in amount of at least 2 parts and the dye of formula X in an amount of at least 0.2 parts based on 100 parts of the combined weight of dyes of formulae IX and X.

7. The dye mixture of claim 1 containing dyes of formulae IX and XI, wherein the dye of formula IX is present in amount of at least 1.3 parts and the dye of formula XI in an amount of at least 0.2 parts based on 100 parts of the combined weight of dyes of formulae IX and XI.

8. The dye mixture of claim 1 containing dyes of formulae IX and XII, wherein the dye of formula IX is present in amount of at least 1.8 parts and the dye of formula XII in an amount of at least 1.9 parts based on 100 parts of the combined weight of dyes of formulae IX and XII.

9. The dye mixture of claim 1 containing dyes of formulae IX, X and XII, wherein the dye of formula IX is present in amount of at least 0.9 parts, the dye of formula X in an amount of at least 0.1 parts and the dye of formula XII in an amount of at least 1.6 parts based on 100 parts of the combined weight of dyes of formulae IX, X and XII.

10. The dye mixture of claim 1 containing dyes of formulae IX, XI and XII, wherein the dye of formula IX is present in amount of at least 0.7 parts, the dye of formula XI in an amount of at least 0.2 parts and the dye of formula XII in an amount of at least 1.4 parts of the combined weight of dyes of formulae X, XI and XII.

11. A dye preparation comprising 10–60% by weight of the dye mixture of claim 1 and 40 to 90% of at least one of a dye assistant and water.

* * * * *